W. O. WADE & C. C. CHAPPELLE.
INDICATING DEVICE.
APPLICATION FILED AUG. 26, 1915.
1,275,328.
Patented Aug. 13, 1918.
2 SHEETS—SHEET 1.
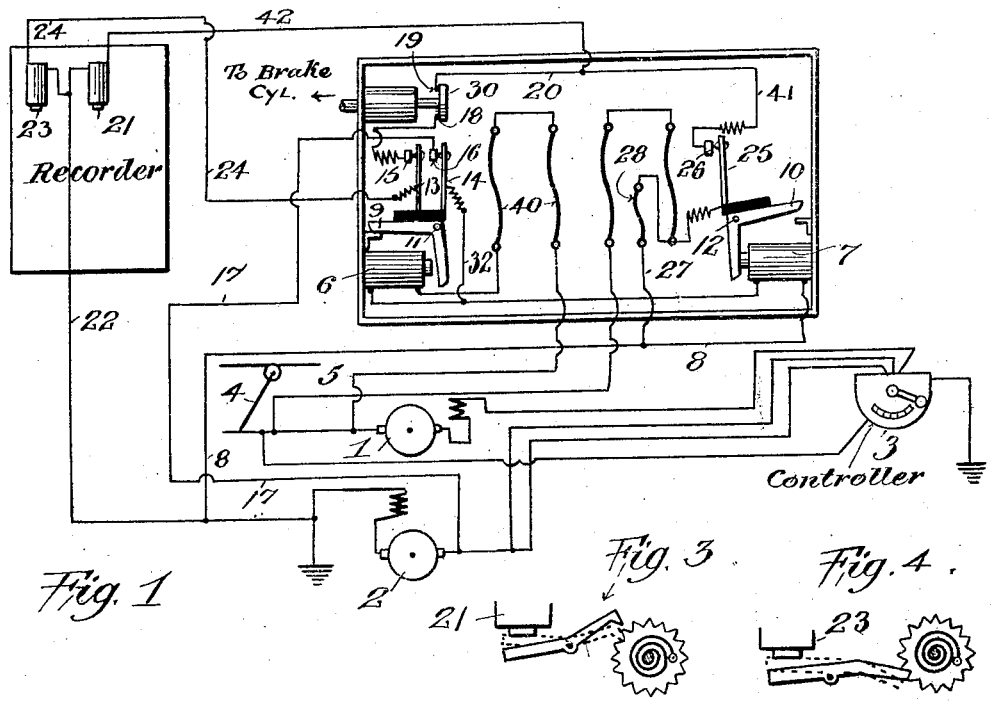
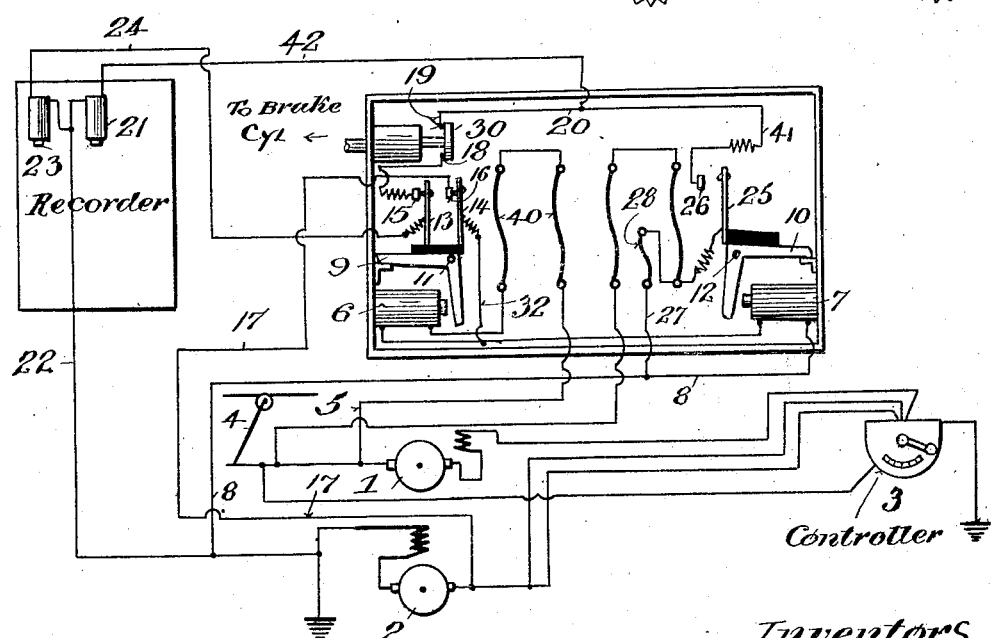

W. O. WADE & C. C. CHAPPELLE.
INDICATING DEVICE.
APPLICATION FILED AUG. 26, 1915.
1,275,328.
Patented Aug. 13, 1918.
2 SHEETS—SHEET 2.
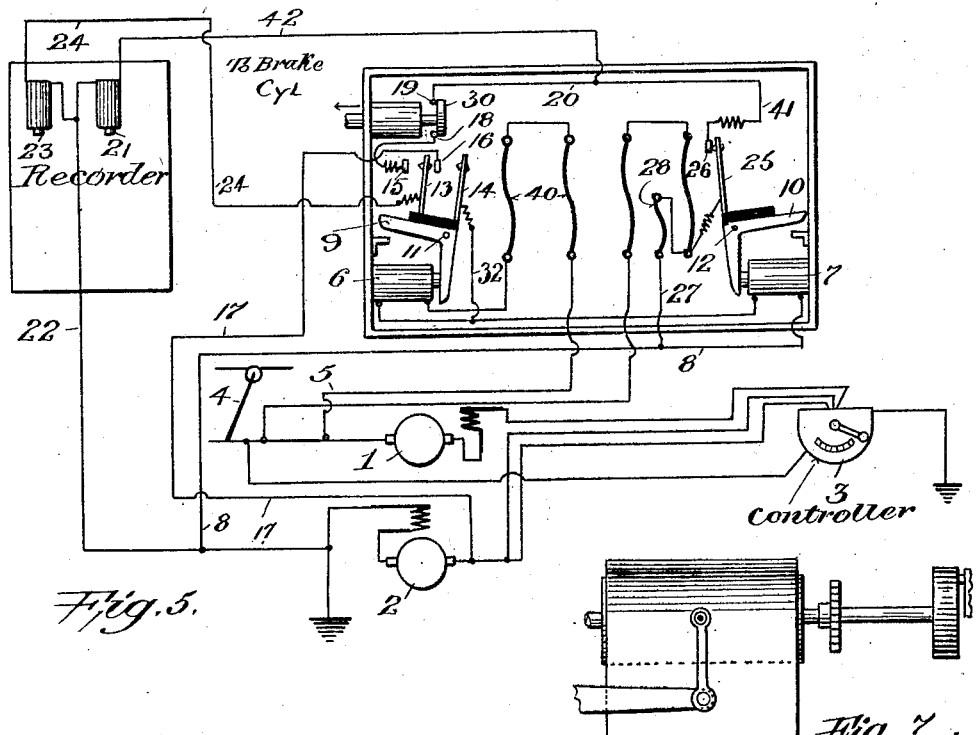
Fig. 5.
Fig. 7.
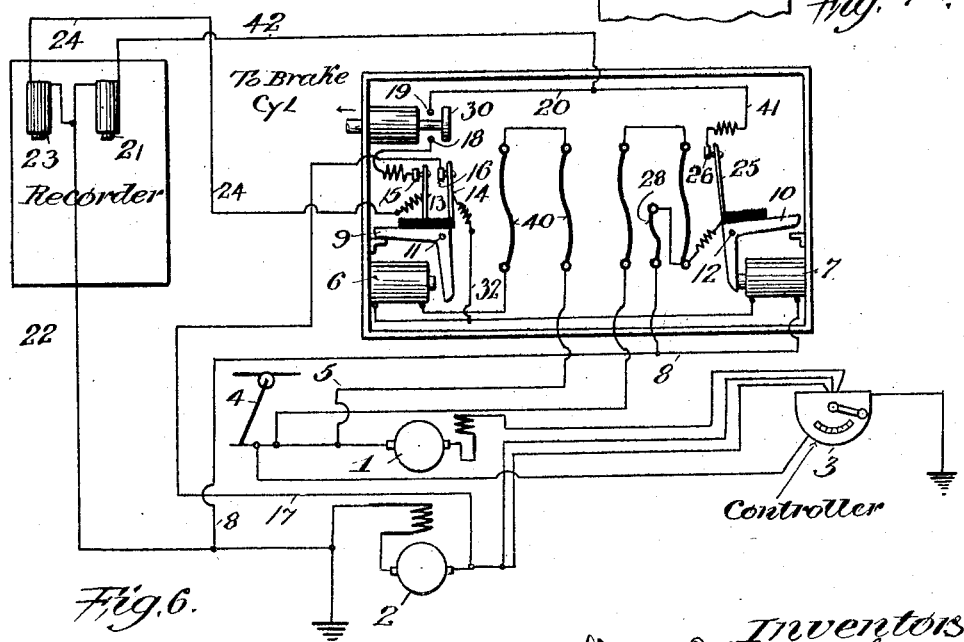
Fig. 6.
Inventors
William O. Wade and
Charles C. Chappelle

UNITED STATES PATENT OFFICE.

WILLIAM O. WADE, OF LOS ANGELES, CALIFORNIA, AND CHARLES C. CHAPPELLE, OF NEW YORK, N. Y., ASSIGNORS TO RAILWAY IMPROVEMENT COMPANY, OF NEW YORK, N. Y., A CORPORATION OF NEW YORK.

INDICATING DEVICE.

1,275,328.   Specification of Letters Patent.   Patented Aug. 13, 1918.

Application filed August 26, 1915.   Serial No. 47,540.

*To all whom it may concern:*

Be it known that we, WILLIAM O. WADE and CHARLES C. CHAPPELLE, both citizens of the United States, and residents, respectively, of Los Angeles, county of Los Angeles, State of California, and of the city, county, and State of New York, have made a certain new and useful Invention in Indicating Devices, of which the following is a specification.

This invention relates to means which combine devices for indicating the coasting as well as the stopping periods of cars, trains or the like.

The object of the invention is to provide a combined coasting and stopping period indicating device which is simple in structure and arrangement and efficient in operation.

Other objects of the invention will appear more fully hereinafter.

The invention consists substantially in the construction, combination, location, and relative arrangement of parts all as will be more fully hereinafter set forth, as shown in the accompanying drawing, and finally pointed out in the appended claims.

Referring to the drawing:—

Figure 1 is a view in circuit diagram showing an arrangement of a combined coasting and stop indicating device embodying the principles of our invention.

Fig. 2 is a similar view showing an arrangement for indicating only the number or duration of stops of a car, train or the like.

Figs. 3 and 4 show simple arrangements for the indicating devices for preventing the operation of the same in accordance with our invention.

Fig. 5 is a view showing the parts in the position assumed when the driving power of the car is applied.

Fig. 6 is a similar view showing the condition and position of the parts when the brakes are applied.

Fig. 7 shows one simple arrangement of a recording or indicating device, the operation of which is controlled by the respective magnets 21 and 23 as will be hereinafter described.

The same part is designated by the same reference numeral wherever it occurs throughout the several views.

In the operation of street cars, trains or the like, it is a well known expedient to employ devices for recording the extent of the coasting travel of the car or train, that is the period of time during which the car or train moves after the propelling power is cut off and before the brakes are applied. It is desirable, however, in order to determine accurately and to maintain the proper time schedule for the operation of cars or trains of a street railway, elevated or subway system, for instance, to ascertain the number of stops or the duration of stops made by the cars during a complete trip. Any excessive time consumed during a stop, or any excessive number of stops made during a trip indicates an interference in the proper time schedule to be maintained, and such interference, of course, affects the operation of the entire system. Where a close headway between cars or trains is necessary the interruption of the time schedule of the system due to excessive stops or excessive duration of stops, becomes a serious matter, and hence the importance and desirability of securing an accurate record of the number of stops made and the duration of such stops, in addition to the coasting time periods, to the end that the railway system may not only be operated economically, but proper and desirable time or trip schedules may be maintained.

However, it is equally desirable to avoid any extra or auxiliary equipment. It is, therefore, among the special purposes of our present invention to provide an apparatus which is simple and effective for indicating the number of stops and the duration of stops, and where a record of the coasting time is also desired, to provide a combined device which will accomplish both results.

In its essential features, our invention contemplates the use of an electrically operated coasting indicating device which may be of the usual or any well known type or structure and operated only when the current is flowing through it; also a stop indicating device of suitable construction, preferably of the spring motor operated type which is electrically controlled in such manner that when the flow of current through the controlling circuit is interrupted, said device becomes operative to accomplish its function. While we are not to be limited to any particular type of indicating device, the clock actuated indicating device shown and described in the Hedley and Doyle patent, No. 1,020,419, dated March 19, 1912, might be used in the present system with the present form of control. It is also within the contemplation of our invention to employ the stop indicating device either alone or in combination with the coasting indicating device and to provide suitable interrelated circuits therefor in the case of the combined devices having such relation that when the car or train is in movement, whether operating under the power of its propelling motors, or under coasting condition, or with the brakes applied, the stop indicating device is maintained against operation, while the coasting indicator is operated under the usual conditions of such devices.

In carrying out our invention in this respect we provide suitably controlled circuits for the stop indicator to maintain the same out of operation when the car is in movement, current supply to said circuit being secured either from the trolley or other source of power for operating the propelling motors, when the latter are operating as motors, or from one or more of the motors operating as generators when the power from the supply trolley or other source is cut off.

We also provide suitable switches controlled by magnets the circuits of which are completed while current is being supplied to the propelling motors, one of the switches controlled by one of said magnets operating to control the circuit of the coasting indicator and the other operating to control an auxiliary circuit of the stop indicator switch control magnet, both of said switches being opened when the circuit of its control magnet is completed and current is flowing therethrough. The auxiliary stop indicator circuit referred to is employed only when the current supply to the propelling motors is cut off and one or more of such motors is operating as a generator. The other magnet controls a switch which is concerned in the control of the stop indicator, and also of the coasting indicator, when the latter is employed, said switch being closed only when the circuit of its control magnet is completed and current is flowing therethrough.

Referring particularly to Fig. 1, reference numerals 1 and 2 designate the car or train propelling motors, and 3 the usual controller employed in connection therewith, current being supplied from the trolley, third rail or other source 4, in the usual manner. The switch control magnets are indicated at 6 and 7. The armature of magnet 6 operates a lever 9 to which is connected the switch arms 13, 14, which, when the magnet is not energized, close upon contacts 15, 16 respectively. The armature of magnet 7, operates a lever 10 to which is connected a switch arm 25, which, when the magnet 7 is energized, closes upon a contact 26.

Under normal running conditions of the car or train while operating under the motive power of current supplied to its propelling motors 1, 2, as shown in Fig. 5, the magnets 6, 7 are both energized by current in a circuit connecting up said magnets in series, and which circuit includes the lead 5, tapped off from the motor supply circuit, the safety fuses 40, magnet 6, magnet 7 and to ground through circuit connection 8. This energizes both magnets 6 and 7, the energization of magnet 6 causing the switch arms 13, 14, to open the circuits controlled thereby at contacts 15, 16, while the energization of magnet 7 causes switch arm 25 to close upon contact 26. Thereupon the following circuit is completed. From the current supply side of the motors through wire 5, fuses 40, magnet 6, magnet 7, wire 8, wire 27, fuse 28, switch arm 25, contact 26, wire 41, wire 42, stop controller 21, wire 22 to ground. The flow of current through this circuit holds the indicating device 21 out of action. Under the same conditions the circuit of the coasting indicator 23 is opened at 13, 15, and hence the said coasting indicator is out of action. This is apparent upon reference to Figs. 3 and 4, where it will be seen, that the spring actuation of the indicating device 21 is inoperative when the magnet is energized, and that of the device 23 is made operative when the magnet is energized.

Now suppose that current supply to the propelling motors is cut off and the car or train continues to move under its own momentum, whether the brakes are applied or not, the current supply to the circuit of the magnets 6 and 7 is thereupon cut off through wire 5 and on as above traced. The continued movement of the car or train, however, drives the motor armatures. Now if the car continues to travel with the current to the motor shut off the motor becomes a generator of current as long as the momentum movement of the car or train continues. This principle is well recognized in the art and is discussed at length in the patent to Hall and Hall, No. 1,201,041, issued October 10th, 1916. The position of the elements under this condition is that shown in Fig. 1. We have shown the motor 2 as thus acting as a generator, the current generated is supplied through the following circuit. Wire 17, contact 16, switch arm 14, these being closed upon each other since, under the conditions referred to the magnet 6 is deënergized, to wire 32, magnet 7, wire 8 to the other side of the generator. This energizes magnet 7, and closes switch arm 25 upon contact 26, thereby completing the following circuit. From one side of the motor 2, acting as a generator, through wire 17, contact 15, switch arm 14, wire 32, magnet 7, wire 8, wire 27, fuse 28, switch arm 25, contact 26, wire 41, the circuit then dividing, one branch continuing through wire 42, stop indicator 21, wire 22 to ground or return to the other side of the generator, the other branch continuing from wire 41, through wire 20, contacts 19, 18 and bridge piece 30, contact 15, switch arm 13, wire 24, coasting indicator 23 and on to return 22. Consequently current continues to flow through the circuit of the stop indicator 21, thereby maintaining said indicator out of action. Also so long as the branch circuit through the coasting indicator 23 remains completed at contacts 19, 18, current will continue to flow through said coasting indicator and the same will operate to indicate the coasting time of the car or train. By arranging this branch circuit to be opened when the brakes are applied the true coasting indication of the car or train will be secured. This result may be obtained by connecting the bridge piece 30 which bridges the contacts 19, 18, to be shifted when the brake is applied, as for instance by means of plunger 30, so as to open the circuit between said contacts.

By omitting the circuits concerned in the operation of the coasting indicator, and the switch 13 and its contacts 15 and the circuit controlled thereby, the coasting indicator may be omitted and only the stop indicator employed.

From the foregoing description it will be seen that we provide an exceedingly simple arrangement for making a record of the number of stops made by a car or train, and the duration of each stop. We also provide a simple arrangement whereby such a device is combined with means to indicate the coasting time of the car or train.

It is to be understood that many variations and changes may readily occur to persons skilled in the art and still fall within the spirit and scope of our invention, as defined in the claims.

While, therefore, we have shown and described various arrangements embodying our invention, what we claim as new and useful and of our own invention and desire to secure by Letters Patent, is,—

1. The combination with a coasting indicating device for cars, of an indicating device for indicating, for the purpose of recording the same, only the stops of the car when the car comes to a full stop, and means for maintaining both of said devices inoperative while the car is being propelled by power.

2. The combination with a coasting indicating device for cars of an indicating device for indicating, for the purpose of recording the same, only the stops of the car when the car comes to a full stop, and means for rendering said coasting indicating device operative when the car propelling power is shut off and the car moves under its own momentum, said means maintaining said stop indicating device inoperative.

3. The combination with a coasting indicating device for cars, of an indicating device for indicating, for the purpose of recording the same, only the stops of the car when the car comes to a full stop, and means for rendering said coasting indicating device inoperative while the car is stationary, said means rendering the stop indicating device operative.

4. The combination with a coasting indicating device for cars, of an indicating device for indicating, for the purpose of recording the same, only the stops of the car when the car comes to a full stop, and electro-magnets for controlling the operation of said devices, the circuits of said electro-magnets being controlled by the movements of the car.

5. The combination with a coasting indicating device for cars, of an indicating device for indicating, for the purpose of recording the same, only the stops of the car when the car comes to a full stop, and an electro magnet normally operating to maintain said stop indicating device inoperative while the car is in motion.

6. The combination with a coasting indicating device for cars, of an indicating device for indicating, for the purpose of recording the same, only the stops of the car when the car comes to a full stop, and means operated by the car motor employed as a generator for maintaining said stop indicating device inoperative while said coasting indicating device is operative.

7. The combination with a coasting indicating device for cars, of an indicating device for indicating, for the purpose of recording the same, only the stops of the car when the car comes to a full stop, and means for maintaining one of said devices inoperative when the propelling power is shut off.

8. The combination with a coasting indicating device for cars, of an indicating device for indicating, for the purpose of recording the same, only the stops of the car when the car comes to a full stop, and means for rendering said coasting indicating device operative and the stop indicating device inoperative when the car propelling power is shut off and the car is in motion.

9. The combination with a coasting indicating device for cars, of an indicating device for indicating, for the purpose of recording the same, only the stops of the car when the car comes to a full stop, and means for rendering and maintaining said stop indicating device operative when the car is stationary.

10. An indicating device to indicate only the stops of cars for the purpose of recording the same, and means controlled by the supply of current to the car propelling motors for rendering said device inoperative.

11. An indicating device to indicate only the stops of cars for the purpose of recording the same, and means to automatically operate said device when the car stops.

12. An indicating device to indicate only the stops of cars, and means to automatically operate said device when the car stops, said means operating to continue said indicating device in operation as long as the car remains at rest.

13. An indicating device to indicate only the stops of cars for the purpose of recording the same, and means actuated by the coasting travel of the car to maintain said device inoperative.

14. An indicating device to indicate only the stops of cars, and means actuated when the car is in motion to maintain said device inoperative.

15. An indicating device to indicate only the stops of cars and means to operate said device only when the car comes to rest.

16. An indicating device to indicate the stops of cars, and means to operate said device when the car comes to rest, said means operating to maintain said device in operation as long as the car remains at rest.

17. An indicating device to indicate only the stops of cars for the purpose of recording the same, a circuit therefor, said device remaining inoperative when said circuit is completed, and means operating when the car is in motion to complete said circuit.

18. An indicating device to indicate only the stops of cars, a circuit therefor, said device remaining inoperative when said circuit is completed, and means operating when the car propelling motor acts as a generator to complete said circuit.

19. An indicating device to indicate only the stops of cars for the purpose of recording the same, a circuit therefor, said device being rendered operative when said circuit is opened and means operating when the car is in motion to keep said circuit closed.

20. An indicating device to indicate only the stops of cars, a circuit therefor, said device being rendered operative when said circuit is opened, and means operated by the car propelling motor acting as a generator for maintaining said circuit closed.

21. An indicating device to indicate only the stops of cars for the purpose of recording the same, a circuit therefor, said device being rendered operative when said circuit is opened, means operated by the supply of current to the car propelling motor for maintaining said circuit closed and an auxiliary circuit connected across the terminals of the motor.

In testimony whereof we have hereunto set our hands on this 10th and 24th day of August, A. D. 1915, respectively.

WILLIAM O. WADE.
CHARLES C. CHAPPELLE.